United States Patent [19]

Halling et al.

[11] Patent Number: 4,457,523

[45] Date of Patent: Jul. 3, 1984

[54] TORSIONALLY FLEXIBLE METALLIC ANNULAR SEAL

[75] Inventors: Horace P. Halling, Laurel; Robert A. Barrett, Crofton, both of Md.

[73] Assignee: Pressure Science Incorporated, Beltsville, Md.

[21] Appl. No.: 437,869

[22] Filed: Oct. 29, 1982

[51] Int. Cl.³ .............................................. F16J 15/08
[52] U.S. Cl. ................................ 277/236; 277/206 R; 277/212 C
[58] Field of Search ........... 277/236, 200, 205, 206 R, 277/212 R, 212 C

[56] References Cited

U.S. PATENT DOCUMENTS

| | | | |
|---|---|---|---|
| 2,452,469 | 10/1948 | Johnson | 277/181 |
| 2,774,618 | 12/1956 | Alderson | 285/223 |
| 3,192,690 | 7/1965 | Taylor | 277/205 X |
| 3,285,632 | 11/1966 | Dunkle | 277/236 X |
| 3,490,777 | 1/1970 | Emmerson | 277/206 |
| 3,561,793 | 2/1971 | Rode | 285/13 |
| 3,575,432 | 4/1971 | Taylor | 277/206 R X |
| 3,751,048 | 8/1973 | Rode | 277/200 |
| 3,761,102 | 9/1973 | Nicholson | 277/236 |
| 3,797,836 | 3/1974 | Halling | 277/200 |
| 3,857,572 | 12/1974 | Taylor et al. | 277/9.5 |
| 3,869,132 | 3/1975 | Taylor et al. | 277/26 |
| 4,054,306 | 10/1977 | Sadoff, Jr. et al. | 285/233 |
| 4,121,843 | 10/1978 | Halling | 277/236 X |
| 4,199,151 | 4/1980 | Bartos | 277/206 R X |
| 4,218,067 | 8/1980 | Halling | 277/205 |
| 4,281,841 | 8/1981 | Kim et al. | 277/236 |
| 4,336,943 | 6/1982 | Chaplin | 277/26 |

FOREIGN PATENT DOCUMENTS

| | | | |
|---|---|---|---|
| 2121731 | 11/1972 | Fed. Rep. of Germany | 277/236 |
| 2815075 | 10/1979 | Fed. Rep. of Germany | 277/236 |
| 2909223 | 10/1979 | Fed. Rep. of Germany | 277/236 |
| 444217 | 3/1936 | United Kingdom | 277/198 |
| 805350 | 12/1958 | United Kingdom | |

*Primary Examiner*—Robert S. Ward
*Attorney, Agent, or Firm*—Roylance, Abrams, Berdo & Goodman

[57] ABSTRACT

A torsionally flexible annular seal in the form of a metallic, resilient sealing ring for a pair of concentric, hollow annular bodies having high pressure and temperature fluid flowing therethrough and having different thermal expansion rates and/or temperatures. The sealing ring comprises a central tapering portion, a first curvilinear sealing portion at one end of the central portion, and a second curvilinear sealing portion at the other end of the central portion. In one embodiment the central tapering portion is frustoconical, and in a second it has convex and concave portions. The first and second sealing portions seal against inner and outer cylindrical surfaces defined by the pair of annular bodies, this sealing including at least two circular sealing lines in different planes.

25 Claims, 8 Drawing Figures

TORSIONALLY FLEXIBLE METALLIC ANNULAR SEAL

FIELD OF THE INVENTION

The invention relates to a torsionally flexible annular seal formed as a metallic, resilient sealing ring for a pair of concentric, hollow annular bodies having high pressure and temperature fluid flowing therethrough. The sealing ring includes a central tapering portion, a first curvilinear sealing portion at one end of the central portion, and a second curvilinear sealing portion at the other end of the central portion. The sealing ring is especially useful in turbine engine assemblies between concentric, hollow annular bodies that thermally expand at different rates and are exposed to temperatures up to about 1400° F. and pressures of 400-500 psi.

BACKGROUND OF THE INVENTION

Resilient, metallic sealing rings are well known in the art for sealing between a pair of coupled concentric, hollow annular bodies having high temperature and pressure fluid flowing therethrough. These sealing rings have numerous configurations, usually depending upon the cavity to be sealed. While these seals are effective in many situations, a need has long existed for a resilient metallic sealing ring capable of maintaining a tight seal between two cylindrical surfaces that expand at different rates, due to differences in their temperatures or in their coefficients of thermal expansion. The basic problem with providing such a seal is that the expansion of the cylindrical surfaces tends to compress the seal beyond its elastic range and thus the seal does not recover to a sealing configuration once the expansion cycle is completed. In other words, the cross sectional width of the sealing ring is permanently decreased, thereby causing leakage to commence almost as soon as the differentially expanded cylindrical surfaces begin to return to their original dimensions. This is usually caused by significant bending deflections in the seals.

Examples of U.S. patents disclosing prior art annular seals are: 2,774,618 to Alderson; 3,490,777 to Emmerson; 3,561,793 to Rode; 3,751,048 to Rode; 3,797,836 to Halling; 3,857,572 to Taylor et al; 3,869,132 to Taylor et al; 4,054,306 to Sadoff, Jr. et al; 4,121,843 to Halling; 4,218,067 to Halling; 4,281,841 to Kim et al; and 4,336,943 to Chaplin. U.K. Pat. No. 1,511,384 also discloses a prior art annular seal.

SUMMARY

Accordingly, a primary object of the invention is to provide a torsionally flexible annular seal in the form of a metallic, resilient sealing ring that is capable of establishing and maintaining an effective seal between a pair of annular bodies having high pressure and temperature fluid flowing therethrough and that have different rates of thermal expansion.

Another object of the invention is to provide such a metallic resilient sealing ring that can maintain its sealing capability during axial displacement of the annular bodies.

Another object of the invention is to provide such a metallic resilient sealing ring that absorbs radial expansion and contraction of adjacent annular bodies in the elastic range by means of a rotational deflection, not a bending deflection and seals along circular sealing lines in different planes.

The foregoing objects are basically attained by providing a resilient, metallic sealing ring comprising a central tapering annular portion having first and second ends; a first annular sealing portion extending from the first end of the central portion and being curvilinear in cross section; and a second annular sealing portion extending from the second end of the central portion and being curvilinear in cross section.

Advantageously, the first and second sealing portions are substantially semi-circular in cross section, the central portion is upwardly and inwardly tapering from the second end to the first end, and the first and second sealing portions extend radially inwardly of the central portion.

In a first embodiment shown in FIGS. 1-5, the sealing ring central portion is frustoconical and tapers at an angle of about 60° before installation and at about 75° when preloaded and installed.

In a second embodiment shown in FIGS. 6-8, the central portion comprises a concave portion extending from the second sealing portion and a convex portion extending from the first sealing portion.

These first and second sealing portions, extending from the tapering central portion, seal against inner and outer cylindrical surfaces defined by the pair of concentric, annular bodies, this sealing including at least two circular sealing lines in different planes.

Other objects, advantages and salient features of the present invention will become apparent from the following detailed description, which, taken in conjunction with the annexed drawings, discloses preferred embodiments of the invention.

DRAWINGS

Referring now to the drawings which form a part of this original disclosure:

Figure 6:
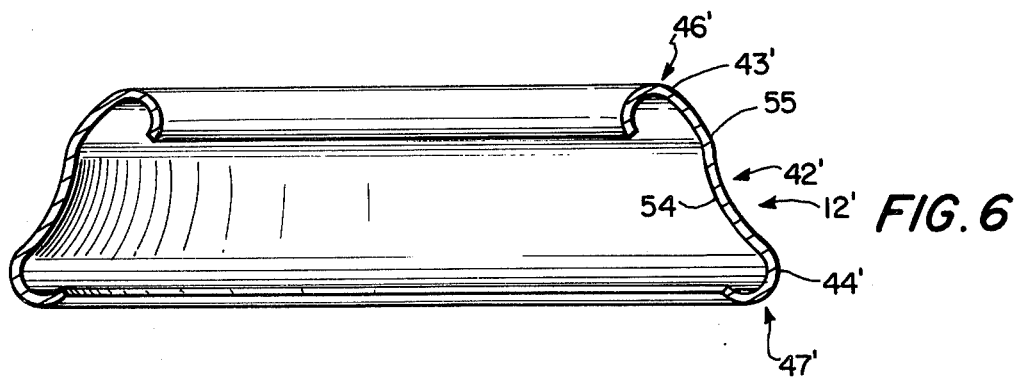
FIG. 6 is a top plan view in longitudinal section of a modified sealing ring having a central portion with a convex portion and a concave portion.
Figure 7:
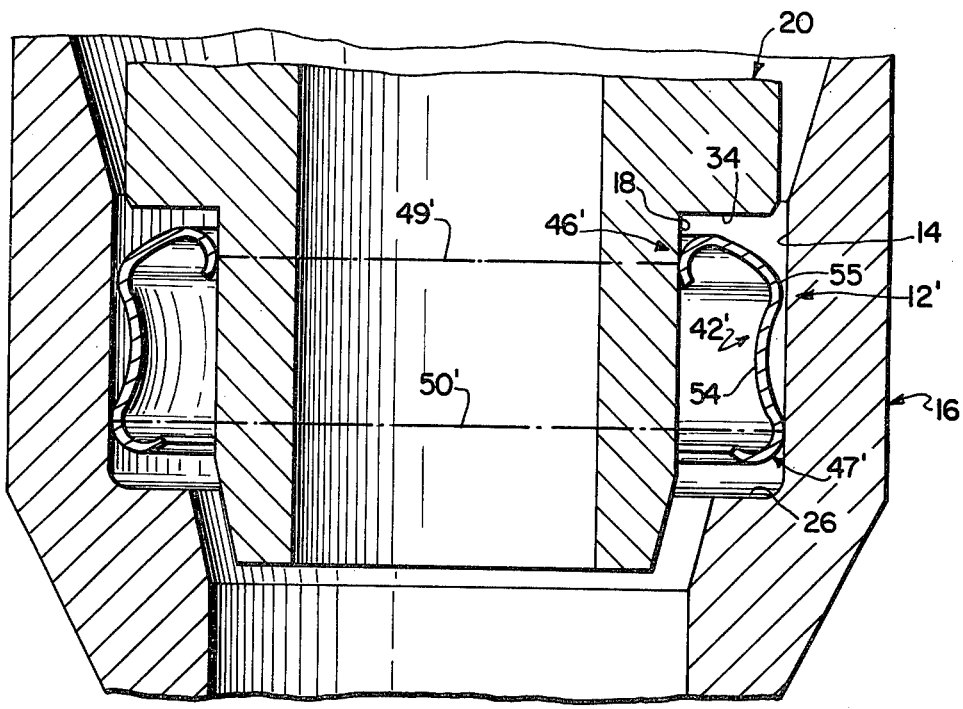
Figure 8:
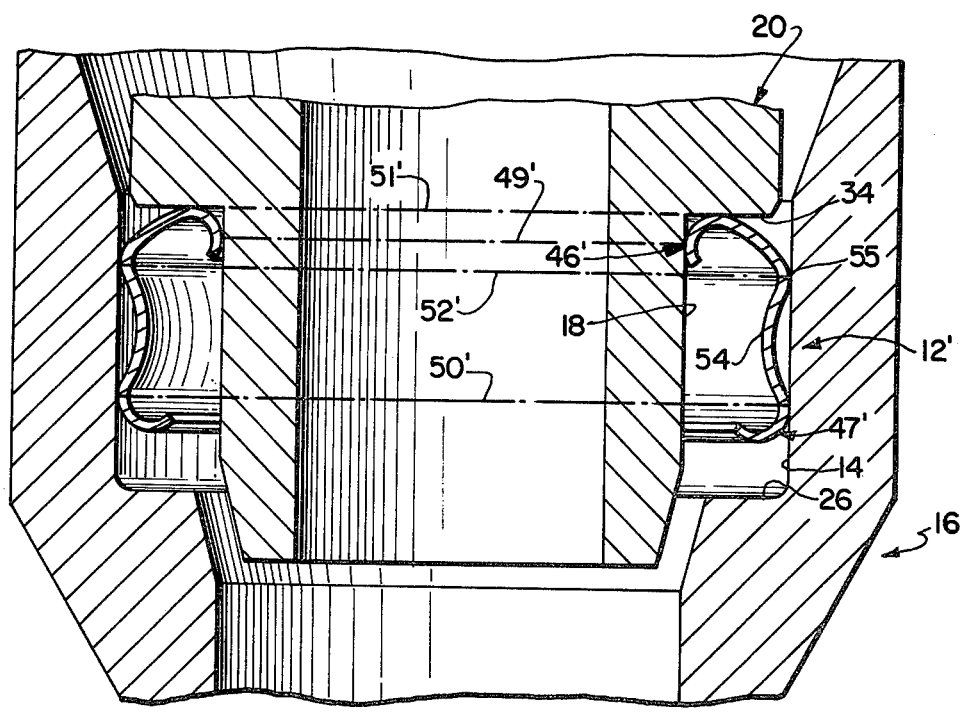

FIG. 7 is a top plan view in longitudinal section of the sealing ring of FIG. 6 installed between the two annular bodies but not yet exposed to a pressure thrust; and FIG. 8 is a view similar to that shown in FIG. 7 except that the sealing ring has been exposed to a pressure thrust, thereby moving the ring into engagement with the axially facing surface extending from the inner cylindrical surface and in addition moving the convex portion of the central portion into sealing engagement with the outer cylindrical surface.

DETAILED DESCRIPTION OF THE INVENTION

As seen in FIGS. 1-5, a sealing assembly 10 in accordance with the invention includes a metallic, resilient sealing ring 12 for use in sealing against a first cylindrical surface 14 on the inner surface of a first outer hollow annular body 16 and a second concentric cylindrical surface 18 on the outer surface of a second inner hollow annular body 20. The sealing ring 12 cross section is torsionally deflected from a condition shown in FIG. 3 to the preloaded condition shown in FIGS. 1 and 2 so that it can torsionally deflect in either direction of torsional rotation upon thermal expansion of the first and second bodies. This is accomplished because the sealing portions seal in different planes, as described hereinafter.

Figure 3:
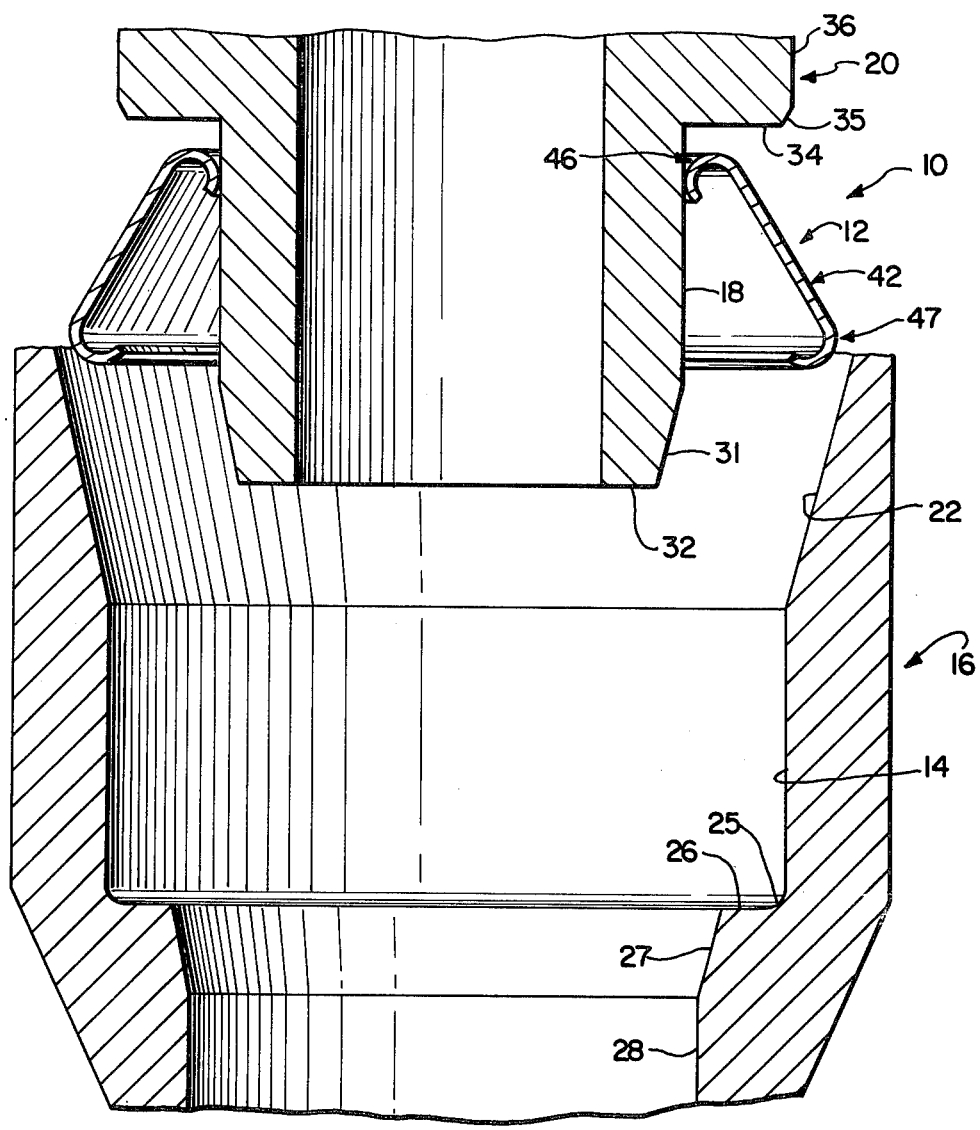
FIG. 3 is a partially exploded view similar to that shown in FIG. 1 showing the sealing ring installed on the inner body and about to be received in the outer body, the sealing ring being in an unloaded condition.

As seen best in FIG. 3, the first outer annular body 16 is tubular and includes above radially inwardly facing cylindrical inner surface 14 a downwardly and inwardly tapering frustoconical surface 22 that tapers at about 6° 30'. This taper is an assembly aid and could be up to about 15° as desired. Below inner cylindrical surface 14 is a curved annular surface 25 that extends into an axially facing annular surface 26 which in turn extends into a downwardly and inwardly tapering frustoconical surface 27. This frustoconical surface tapers at an angle substantially equal to the angle of taper of frustoconical surface 22. Frustoconical surface 27 extends into an inwardly facing cylindrical surface 28 through which the high temperature and pressure fluid flows.

Figure 1:
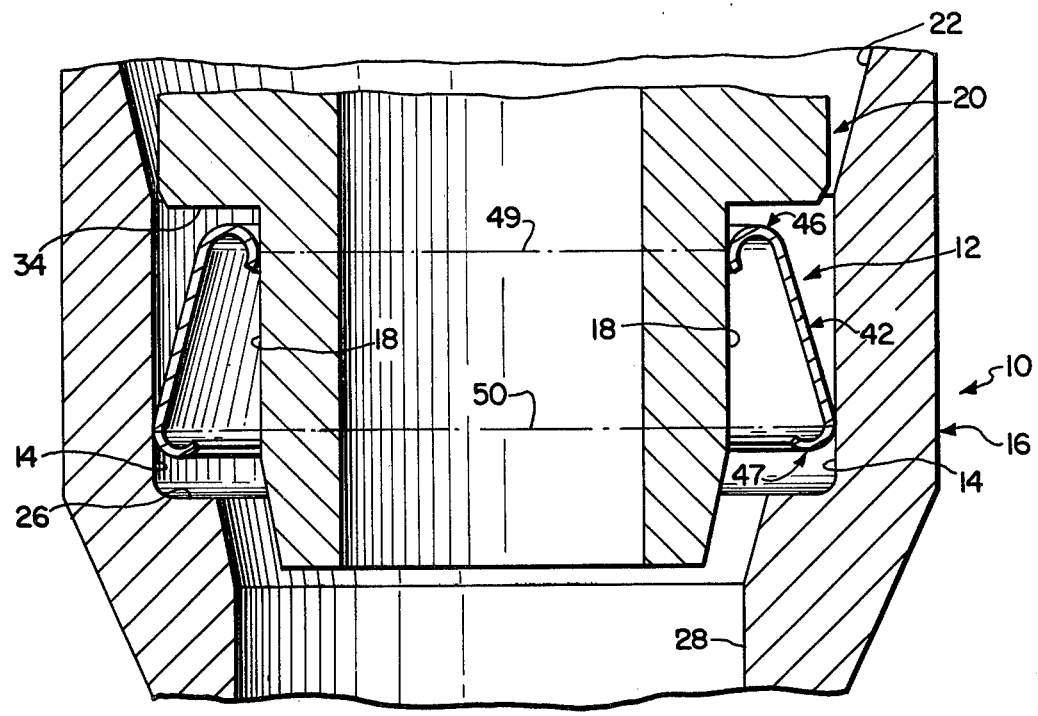
FIG. 1 is a top plan view in longitudinal section of a sealing assembly in accordance with the invention including the metallic, resilient sealing ring in a sealing position between inner and outer cylindrical surfaces defined by a pair of annular bodies.
Figure 2:
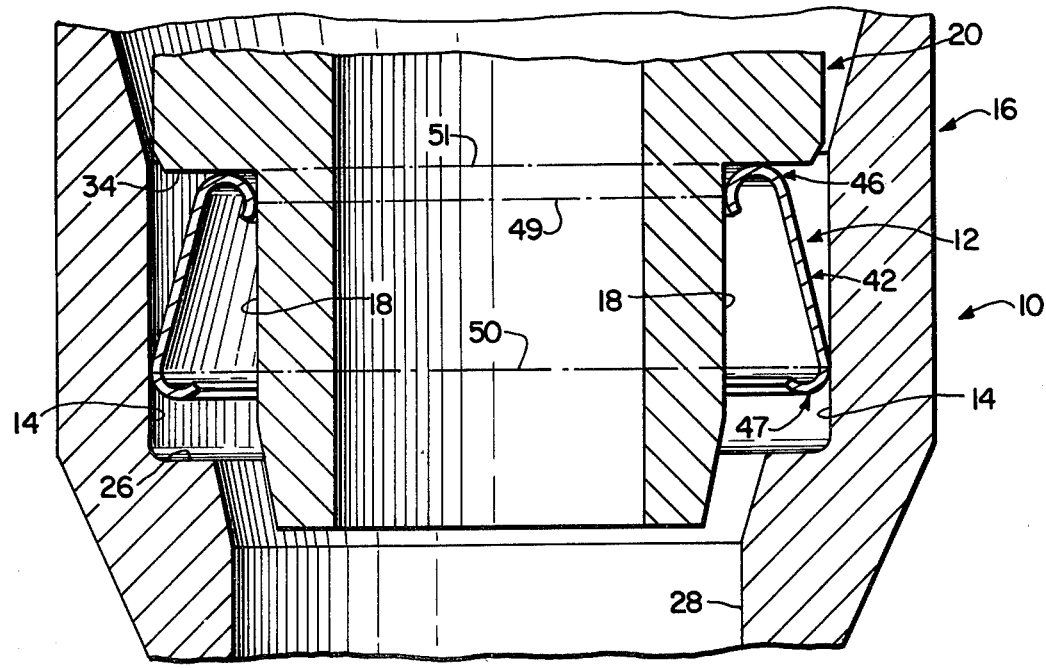
FIG. 2 is a view similar to that shown in FIG. 1 except that a pressure thrust by the fluid flowing through the annular bodies has moved the sealing ring into contact with an axially facing annular surface extending from the inner cylindrical surface.

The second inner body 20 below the radially outwardly facing cylindrical surface 18 has a downwardly and inwardly tapering frustoconical surface 31 leading to an annular axially facing surface 32. Above the cylindrical surface 18 is an axially facing annular surface 34 extending at right angles to surface 18. Above surface 34 is a downwardly and inwardly tapering frustoconical surface 35 which leads into an outwardly facing cylindrical surface 36. As seen in FIGS. 1-3 the second body 20 is hollow with a flow-through end defined by annular surface 32 so that the high pressure and temperature fluid flowing along the first body 16 can pass through the sealing assembly 10 and then into the second body 20. As shown in FIG. 3, the frustoconical surface 31 tapers at an angle of about 15°.

The first and second bodies are connected together once the sealing ring 12 is installed in any conventional fashion which allows relative axial movement due to thermal expansion, but not enough to axially crush ring 12.

Figure 4:
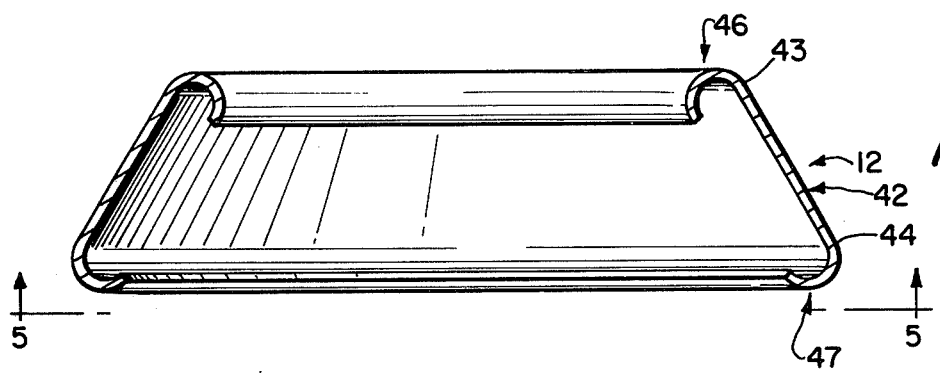
FIG. 4 is a top plan view in longitudinal section of the sealing ring shown in FIGS. 1-3 in its unloaded, rest condition.
Figure 5:
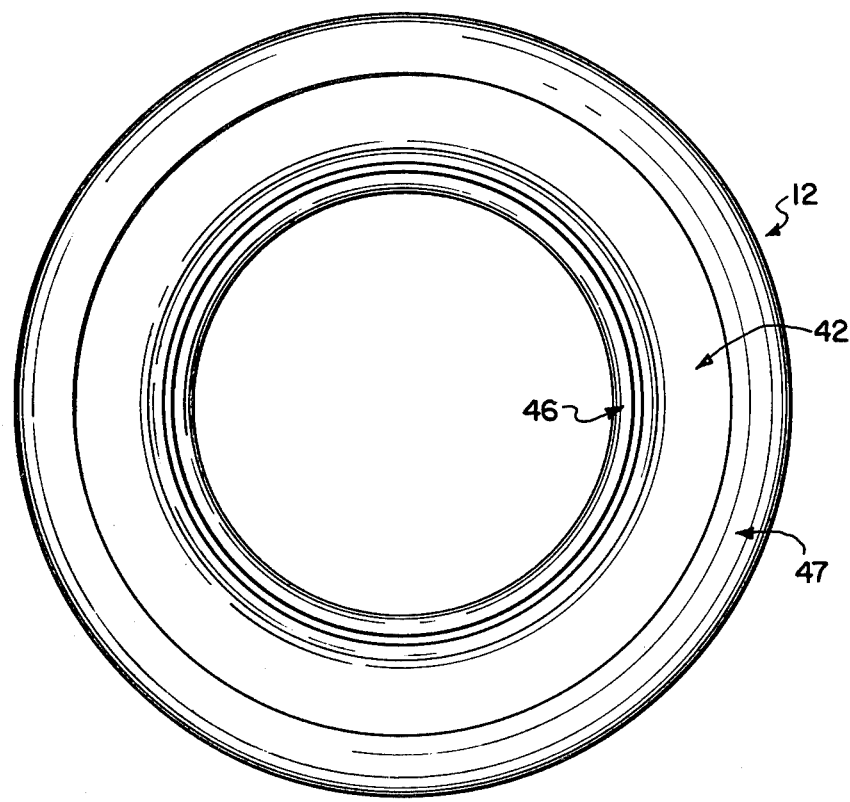
FIG. 5 is a front elevational view of the sealing ring shown in FIG. 4.

The sealing ring 12, as shown in FIGS. 3, 4 and 5, comprises a central tapering portion 42 having a first end 43 and a second end 44, a first annular sealing portion 46 extending from the first end of the central portion and terminating in a free annular edge, and a second annular sealing portion 47 extending from the second end of the central portion and terminating in a free annular edge. Each of these sealing portions is curvilinear in cross section, this cross section being arcuate and substantially semi-circular. Thus, the overall cross section of the ring including the two sealing portions and the central portion is substantially C-shaped.

The sealing portions each extend radially inwardly of the central portion 42. This central portion is upwardly and inwardly tapering from the second end 44 to the first end 43 and is frustoconical, the taper being shown as about 60° in FIG. 4, although the angle of taper can vary depending upon the size of the cavity receiving the ring and the potential expansion of the annular bodies. The diameter of the first sealing portion 46 is smaller than the diameter of the second sealing portion 47, with this first sealing portion intended to sealingly engage the outwardly facing cylindrical surface 18 on the inner second body and with the second sealing portion 47 intended to sealingly engage the inwardly facing cylindrical surface 14 on the first body 16, as seen in FIGS. 1-3.

Preferably, the central portion and two sealing portions of the sealing ring are integrally formed from a precipitation hardened high temperature alloy such as Waspaloy or Inconel.

In the particular sealing assembly 10 shown in FIGS. 1-5, the outer diameter of the sealing ring 12 is 9.130-9.135 inches, the inner diameter is 8.740-8.745 inches, the height is 0.400 inch and the thickness of the material is 0.010 inch. The radius of curvature of the first and second sealing portions 46 and 47 on the ring is about 0.063 inch. The diameter of the inwardly facing cylindrical surface 14 on the first body is 9.115-9.120 inches and the diameter of the outwardly facing cylindrical surface 18 on the second body is 8.755-8.760 inches. The radius of curvature of curved annular surface 25 is 0.040-0.060 inch and the axial length of cylindrical surface 14 is a minimum of 0.555 inch. Since the sealing ring experiences frequent sliding and the surfaces against which it rubs are prone to wear, a wear resistant coating is advantageously applied to the sealing ring or the cylindrical surfaces 14 and 18. One such suitable combination for applications at about 1,000° F. is a coating of Tribaloy 800 on the sealing ring and a coating of Tribaloy 700 on the cylindrical surfaces 14 and 18. Alternatively, the sealing ring can be coated with Tribaloy 800 and the material forming the first and second bodies in the area of cylindrical surfaces 14 and 18 can be Incoloy 913. The sealing assembly can advantageously be used at temperatures up to 1400° F. and pressures of 400-500 psi.

ASSEMBLY AND OPERATION

To assemble the sealing assembly 10, the sealing ring 12 is first received on the cylindrical surface 18 on the second body 20 with an interference fit of about 0.010-0.020 inch shown in FIG. 3. Then, the first body 16 is moved axially towards the second body so that the second sealing portion 47 on the sealing ring engages frustoconical surface 22 on the first body. Continued axial movement of the first body towards the second body will cause the sealing ring to be radially inwardly deflected into a preload condition until the second sealing portion 47 is fully received in the cylindrical surface 14 of the first body, as seen in FIG. 1. This axial movement is continued until the seal 12 is enclosed in the cavity defined by surfaces 14, 18, 26 and 34 with sufficient axial clearance to permit operating axial movements of the bodies without causing axial compression of the seal as seen in FIG. 1. The bodies are then conventionally connected. In this position, the preloaded sealing ring is torsionally deflected so that it tapers at an angle of about 75°. As seen in FIG. 1, a primary circular sealing line 49, shown in phantom, is established between cylindrical surface 18 and the inner surface of the first sealing portion 46 of the sealing ring. In addition, a second primary circular sealing line 50, shown in phantom, is established in a different plane by engagement of the outer surface of the second sealing portion 47 with the inwardly facing cylindrical surface 14 of the first body. Thus, the seal 12 effectively seals the cavity defined by the opposed cylindrical surfaces 14 and 18, axially facing annular surface 34 on the second body and axially facing annular surface 26 on the first body.

When high pressure fluid is introduced into the assembly 10, the pressure thrusts the sealing ring 12 against axially facing surface 34, as seen in FIG. 2. Thus, the primary circular sealing lines 49 and 50 are axially displaced but a secondary circular sealing line 51 is established between the upper surface of the first sealing portion 46 and the axially facing annular surface 34 as shown in FIG. 2. As is evident, these circular sealing lines are constantly in different planes.

In the conditions shown in FIG. 1 or 2, any thermal expansion or slight axial displacement of the first and second bodies will result in a maintenance of the sealing thereof by sealing ring 12 due to its preload and torsionally or rotational deflection capability. Typically, the bending rigidity of the sealing portions is greater than the torsional rigidity of the central portion, so the expansion of the bodies is reflected in a torsional deflection of the central portion rather than bending of the sealing portions since the sealing portions are in different planes.

The interference fit mentioned above regarding surface 18 and ring 12 is by way of example only since the interference fit must be adjusted in specific cases to allow for the different expansion rates of the specific materials used.

EMBODIMENT OF FIGS. 6-8

As shown in FIGS. 6-8, a second embodiment of the invention is illustrated where the configurations of the first and second bodies 16 and 20 are the same but the configuration of the sealing ring 12' is different. Accordingly, the reference numerals used with regard to the first and second bodies above regarding FIGS. 1-5 remain the same.

As seen in FIG. 6, the sealing ring 12' comprises a central tapering portion 42' having first and second ends 43' and 44', a first sealing portion 46' extending from the first end and a second sealing portion 47' extending from the second end. This structure is similar to that described above regarding sealing ring 12. In this embodiment, however, the central tapering portion 42' has a concave portion 54 extending from the second sealing portion 47' and a convex portion 55 extending from the first sealing portion 46', these concave and convex portions extending into each other near the middle of the central portion.

The assembly and operation of the sealing ring 12' is similar to that described above regarding sealing ring 12, except that sealing ring 12' is more suitable to higher pressure environments.

Thus, once the sealing ring 12' is installed as shown in FIG. 7, a primary sealing line 49', shown in phantom, is established between cylindrical surface 18 and the first sealing portion 46'. Similarly, a second primary circular sealing line 50', shown in phantom, is established between engagement of the second sealing portion 47' and the inwardly facing cylindrical surface 14. In this condition shown in FIG. 7, the convex portion 55 on the sealing ring 12' is lightly touching or slightly spaced away from cylindrical surface 14.

However, upon conduction of high pressure and temperature fluid through the first and second bodies 16 and 20, the sealing ring 12' will move axially to a position seen in FIG. 8. In this configuration, the primary circular sealing lines 49' and 50' have been upwardly displaced and in addition a secondary circular sealing line 51' has been established between the upper surface of the first sealing portion 46' and the axially facing annular surface 34. Moreover, a second secondary circular sealing line 52' has been established between the outwardly facing and now outwardly deflected convex portion 55 of the sealing ring and the inwardly facing cylindrical surface 14 of the first body 16. The addition of this sealing line adds to the sealing capability of the sealing ring 12'.

While two advantageous embodiments have been chosen to illustrate the invention, it will be understood by those skilled in the art that various changes and modifications can be made therein without departing from the scope of the invention as defined in the appended claims.

What is claimed is:

1. A resilient, metallic sealing ring comprising:
   a central tapering annular portion having first and second ends;
   a first annular sealing portion extending from said first end of said central portion, terminating in a free annular edge and being arcuate in cross section; and
   a second annular sealing portion extending from said second end of said central portion, terminating in a free annular edge and being arcuate in cross section,
   said central portion being upwardly and inwardly tapering from said second end to said first end,
   said first and second annular sealing portions defining, respectively, first and second annular sealing lines which are located in spaced, parallel planes that are perpendicular to the longitudinal axis of said central tapering annular portion,
   said first annular sealing line facing radially inwardly of said central tapering annular portion,
   said second annular sealing line facing radially outwardly of said central tapering annular portion.

2. A sealing ring according to claim 1, wherein said first sealing portion is substantially semicircular in cross section.

3. A sealing ring according to claim 2, wherein said second sealing portion is substantially semicircular in cross section.

4. A sealing ring according to claim 1, wherein the angle of taper of said central portion is about 60°.

5. A resilient, metallic sealing ring comprising:
   a central tapering annular portion having first and second ends;
   a first annular sealing portion extending from said first end of said central portion, terminating in a free annular edge and being arcuate in cross section; and
   a second annular sealing portion extending from said second end of said central portion, terminating in a free annular edge and being arcuate in cross section,
   said first sealing portion having a diameter smaller than the diameter of said second sealing portion,
   said first and second annular sealing portions defining, respectively, first and second annular sealing lines which are located in spaced, parallel planes that are perpendicular to the longitudinal axis of said central tapering annular portion, said first annular sealing line facing radially inwardly of said central tapering annular portion, said second annular sealing line facing radially outwardly of said central tapering annular portion.

6. A resilient, metallic sealing ring comprising:
a central tapering annular portion having first and second ends;
a first annular sealing portion extending from said first end of said central portion, terminating in a free annular edge and being arcuate in cross section; and
a second annular sealing portion extending from said second end of said central portion, terminating in a free annular edge and being arcuate in cross section,
said first sealing portion extending radially inwardly of said central portion, and
said second sealing portion extending radially inwardly of said central portion,
said first and second annular sealing portions defining, respectively, first and second annular sealing lines which are located in spaced, parallel planes that are perpendicular to the longitudinal axis of said central tapering annular portion,
said first annular sealing line facing radially inwardly of said central tapering annular portion,
said second annular sealing line facing radially outwardly of said central tapering annular portion.

7. A resilient, metallic sealing ring comprising:
a central tapering annular portion having first and second ends;
a first annular sealing portion extending from said first end of said central portion, terminating in a free annular edge and being arcuate in cross section; and
a second annular sealing portion extending from said second end of said central portion, terminating in a free annular edge and being arcuate in cross section,
said central portion being frustoconical,
said first and second annular sealing portions defining, respectively, first and second annular sealing lines which are located in spaced, parallel planes that are perpendicular to the longitudinal axis of said central tapering annular portion,
said first annular sealing line facing radially inwardly of said central tapering annular portion,
said second annular sealing line facing radially outwardly of said central tapering annular portion.

8. A sealing ring according to claim 1, wherein said central portion comprises
a concave portion extending from said second sealing portion, and
a convex portion extending from said first sealing portion.

9. A sealing ring according to claim 1, wherein
said first sealing portion extends radially inwardly of said central portion, and
said second sealing portion extends radially inwardly of said central portion.

10. A sealing assembly for first and second concentric annular bodies that are coupled together and have high temperature and pressure fluid flowing therethrough, the combination comprising:
a radially inwardly facing, first cylindrical surface on the first body;
a radially outwardly facing, second cylindrical surface on the second body aligned with and spaced radially inwardly of said first cylindrical surface on the first body;
an axially facing, annular surface on the second body extending radially outwardly from said second cylindrical surface; and
a resilient, metallic sealing ring interposed between said first and second cylindrical surfaces for sealing the cavity defined between said first and second cylindrical surfaces,
said sealing ring including
a central tapering portion having first and second ends,
a first sealing portion extending from said first end of said central portion, terminating in a free annular edge and being arcuate in cross section for engaging said second cylindrical surface and said axially facing annular surface, and
a second sealing portion extending from said second end of said central portion, terminating in a free annular edge and being arcuate in cross section for engaging said first cylindrical surface,
said first and second annular sealing portions defining, respectively, first and second annular sealing lines which are located in spaced, parallel planes that are perpendicular to the longitudinal axis of said central tapering annular portion,
said first annular sealing line facing radially inwardly of said central tapering annular portion,
said second annular sealing line facing radially outwardly of said central tapering annular portion.

11. A sealing assembly according to claim 10, wherein
said sealing ring central portion is frustoconical.

12. A sealing assembly according to claim 10, wherein
said sealing ring central portion includes
a convex portion extending from said first sealing portion for engaging said first cylindrical surface under the influence of the pressure of the fluid flowing through the first and second bodies, and
a concave portion extending from said second sealing portion.

13. A sealing assembly according to claim 10, wherein
said first sealing portion is substantially semicircular in cross section, and
said second sealing portion is substantially semicircular in cross section.

14. A sealing ring according to claim 5, wherein said central portion is substantially frustoconical.

15. A sealing ring according to claim 6, wherein said central portion is substantially frustoconical.

16. A sealing ring according to claim 9, wherein said central portion is frustoconical.

17. A sealing ring according to claim 16, wherein said first sealing portion has a diameter smaller than the diameter of said second sealing portion.

18. A sealing ring according to claim 17, wherein said first sealing portion is substantially semi-circular in cross section; and
said second sealing portion is substantially semi-circular in cross section.

19. A sealing ring according to claim 9, wherein said first sealing portion has a diameter smaller than the diameter of said second sealing portion.

20. A sealing ring according to claim 9, wherein said first sealing portion is substantially semi-circular in cross section; and
said second sealing portion is substantially semi-circular in cross section.

21. A sealing ring according to claim 1, wherein the combination of said central portion, said first sealing portion, and said second sealing portion has a substantially C-shaped cross section.

22. A sealing ring according to claim 5, wherein the combination of said central portion, said first sealing portion, and said second sealing portion has a substantially C-shaped cross section.

23. A sealing ring according to claim 6, wherein the combination of said central portion, said first sealing portion, and said second sealing portion has a substantially C-shaped cross section.

24. A sealing ring according to claim 7, wherein the combination of said central portion, said first sealing portion, and said second sealing portion has a substantially C-shaped cross section.

25. A sealing ring according to claim 10, wherein the combination of said central portion, said first sealing portion, and said second sealing portion has a substantially C-shaped cross section.

* * * * *